US012574690B2

(12) United States Patent
Lindrup et al.

(10) Patent No.: US 12,574,690 B2
(45) Date of Patent: Mar. 10, 2026

(54) METHOD OF OPERATING A HEARING AID SYSTEM AND A HEARING AID SYSTEM

(71) Applicant: Widex A/S, Lynge (DK)

(72) Inventors: Rasmus Malik Hoeegh Lindrup, Berkeley, CA (US); Jens Brehm Bagger Nielsen, Ballerup (DK); Asger Ougaard, Frederikssund (DK); Robert Scholes Lyck, Soeborg (DK)

(73) Assignee: Widex A/S, Lynge (DK)

( * ) Notice: Subject to any disclaimer, the term of this patent is extended or adjusted under 35 U.S.C. 154(b) by 171 days.

(21) Appl. No.: 18/566,307

(22) PCT Filed: Jun. 3, 2022

(86) PCT No.: PCT/EP2022/065215
§ 371 (c)(1),
(2) Date: Dec. 1, 2023

(87) PCT Pub. No.: WO2022/254020
PCT Pub. Date: Dec. 8, 2022

(65) Prior Publication Data
US 2024/0267682 A1 Aug. 8, 2024

(30) Foreign Application Priority Data
Jun. 4, 2021 (DK) .............................. PA202100598

(51) Int. Cl.
*G10L 17/04* (2013.01)
*G10L 19/08* (2013.01)
(Continued)

(52) U.S. Cl.
CPC ............ *H04R 25/507* (2013.01); *G10L 17/04* (2013.01); *G10L 19/08* (2013.01); *G10L 19/167* (2013.01);
(Continued)

(58) Field of Classification Search
CPC .............................. H04R 25/507; G10L 17/04
(Continued)

(56) References Cited

U.S. PATENT DOCUMENTS 10,915,818 B1 2/2021 Patel et al.
10,997,970 B1 * 5/2021 Rafii ..................... G10L 21/013
(Continued)

FOREIGN PATENT DOCUMENTS

CN 112767960 A 5/2021
DE 112021002496 T5 * 3/2023 ............. G06N 3/096
EP 3796228 A1 3/2021

OTHER PUBLICATIONS

Min Li, H. G. McAllister, N. D. Black and T. A. De Perez, "Perceptual time-frequency subtraction algorithm for noise reduction in hearing aids," in IEEE Transactions on Biomedical Engineering, vol. 48, No. 9, pp. 979-988, Sep. 2001, doi: 10.1109/10.942587. keywords: {Time frequency analysis; Noise re (Year: 2001).*

(Continued)

*Primary Examiner* — Bharatkumar S Shah
(74) *Attorney, Agent, or Firm* — Sughrue Mion, PLLC

(57) ABSTRACT
A method (500) of operating a hearing aid system in order to provide at least one of improved noise reduction and speech intelligibility and a hearing aid system adapted to carry out the method.

13 Claims, 5 Drawing Sheets

(51) Int. Cl.

| | |
|---|---|
| *G10L 19/16* | (2013.01) |
| *G10L 21/007* | (2013.01) |
| *G10L 21/0208* | (2013.01) |
| *G10L 21/0272* | (2013.01) |
| *G10L 25/30* | (2013.01) |
| *G10L 25/87* | (2013.01) |
| *H04R 25/00* | (2006.01) |

(52) U.S. Cl.

CPC ........ *G10L 21/007* (2013.01); *G10L 21/0208* (2013.01); *G10L 21/0272* (2013.01); *G10L 25/30* (2013.01); *G10L 25/87* (2013.01); *H04R 2225/41* (2013.01); *H04R 2225/43* (2013.01)

(58) Field of Classification Search

USPC ........................................................ 704/270

See application file for complete search history.

(56) References Cited

U.S. PATENT DOCUMENTS

| | | | | |
|---|---|---|---|---|
| 11,875,816 B2 * | 1/2024 | Lee | ........................ | G10L 15/16 |
| 2016/0044425 A1 * | 2/2016 | Westergaard | .......... | H04R 25/70 |
| | | | | 381/315 |
| 2019/0066713 A1 * | 2/2019 | Mesgarani | .............. | G10L 25/30 |
| 2019/0164052 A1 | 5/2019 | Sung et al. | | |
| 2020/0075034 A1 * | 3/2020 | Peleg | .................. | G10L 21/0364 |
| 2020/0098096 A1 | 3/2020 | Moloney | | |
| 2020/0234725 A1 | 7/2020 | Garbacea et al. | | |
| 2020/0395028 A1 | 12/2020 | Kameoka et al. | | |
| 2021/0166706 A1 | 6/2021 | Lim et al. | | |
| 2021/0258703 A1 * | 8/2021 | Wexler | .................... | G10L 25/51 |
| 2022/0207321 A1 * | 6/2022 | Gulati | ...................... | G06N 3/04 |
| 2023/0254650 A1 * | 8/2023 | Lovchinsky | ........... | G10L 25/78 |

OTHER PUBLICATIONS

Ying-Hui Lai, et al. "A Deep Denoising Autoencoder Approach to Improving the Intelligibility of Vocoded Speech in Chochlear Implant Simulation", IEEE Transactions on Biomedical Engineeringg, Jul. 2017, pp. 1568-1578, vol. 64, No. 7.

Marc Aubreville, et al., "Deep Denoising for Hearing Aid Applications", XP081555638, May 3, 2018, 5 pages, arxiv org, Cornell University Library.

International Search Report for PCT/EP2022/065215 dated Sep. 13, 2022 (PCT/ISA/210).

Written Opinion for PCT/EP2022/065215 dated Sep. 13, 2022 (PCT/ISA/237).

Communication issued Dec. 2, 2021 in Danish Application No. PA202100598.

\* cited by examiner

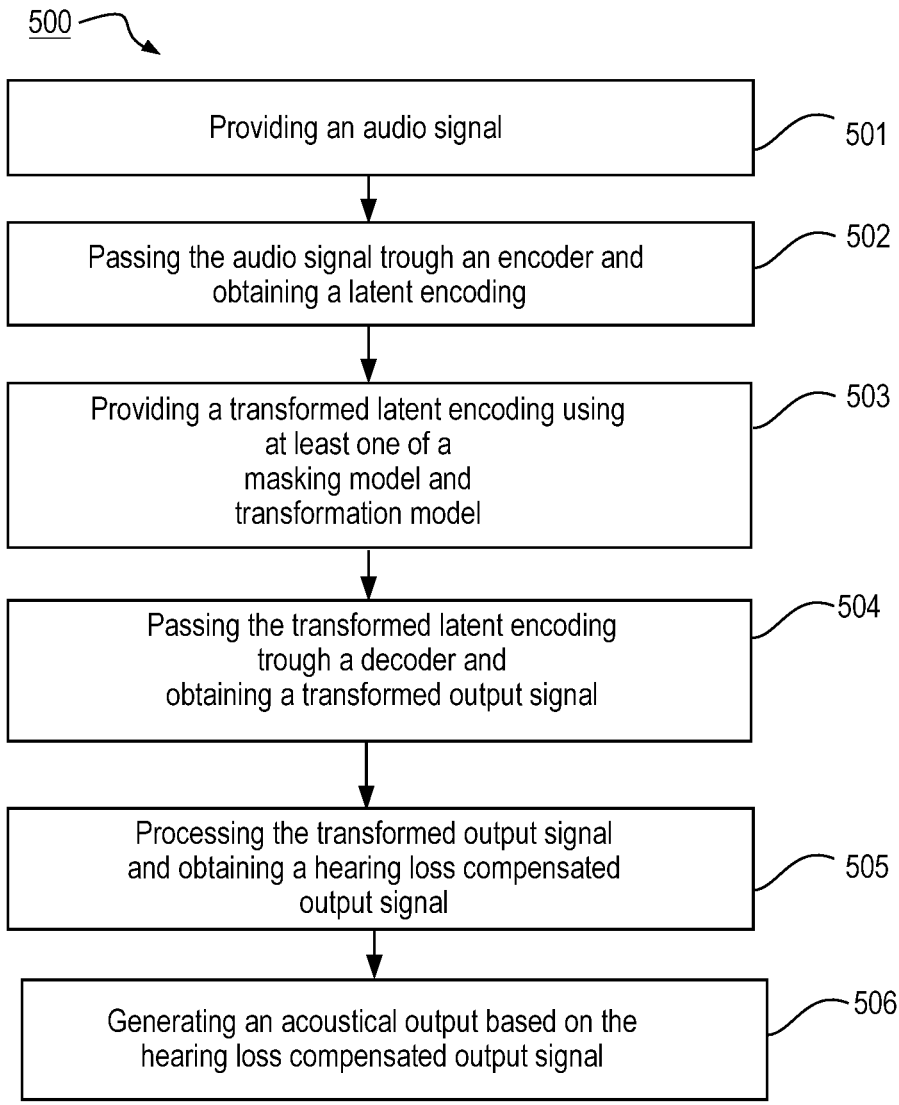

500

| Providing an audio signal | 501 |

| Passing the audio signal trough an encoder and obtaining a latent encoding | 502 |

| Providing a transformed latent encoding using at least one of a masking model and transformation model | 503 |

| Passing the transformed latent encoding trough a decoder and obtaining a transformed output signal | 504 |

| Processing the transformed output signal and obtaining a hearing loss compensated output signal | 505 |

| Generating an acoustical output based on the hearing loss compensated output signal | 506 |

*Fig. 5*

METHOD OF OPERATING A HEARING AID SYSTEM AND A HEARING AID SYSTEM

CROSS REFERENCE TO RELATED APPLICATIONS

This application is a National Stage of International Application No. PCT/EP2022/065215 filed Jun. 3, 2022, claiming priority based on Danish Patent Application No. PA202100598 filed Jun. 4, 2021.

The present invention relates to a method of operating a hearing aid system. The present invention also relates to a hearing aid system adapted to carry out said method.

BACKGROUND OF THE INVENTION

An audio device system may comprise one or two audio devices. In this application, an audio device should be understood as a small, battery-powered, microelectronic device designed to be worn in or at an ear of a user. The audio device generally comprises an energy source such as a battery or a fuel cell, at least one microphone, a microelectronic circuit comprising a digital signal processor, and an acoustic output transducer. The audio device is enclosed in a casing suitable for fitting in or at (such as behind) a human ear.

If the audio device furthermore is capable of amplifying an ambient sound signal in order to alleviate a hearing deficit the audio device may be considered a personal sound amplification product or a hearing aid.

According to variations the mechanical design of an audio device may resemble those of hearing aids and as such traditional hearing aid terminology may be used to describe various mechanical implementations of audio devices that are not hearing aids. As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In more recent types of hearing aids, a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids. In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids or Invisible-In-Canal (IIC). This type of hearing aid requires an especially compact design in order to allow it to be arranged in the ear canal, while accommodating the components necessary for operation of the hearing aid.

Generally, a hearing aid system according to the invention is understood as meaning any device which provides an output signal that can be perceived as an acoustic signal by a user or contributes to providing such an output signal, and which has means which are customized to compensate for an individual hearing loss of the user or contribute to compensating for the hearing loss of the user.

Within the present context an audio device system may comprise a single audio device (a so called monaural audio device system) or comprise two audio devices, one for each ear of the user (a so called binaural audio device system). Furthermore, the audio device system may comprise at least one additional device (which in the following may also be denoted an external device despite that it is part of the audio device system), such as a smart phone or some other computing device having software applications adapted to interact with other devices of the audio device system. However, the audio device system may also include a remote microphone system (which generally can also be considered a computing device) comprising additional microphones and/or may even include a remote server providing abundant processing resources and generally these additional devices will also include link means adapted to operationally connect to the various other devices of the audio device system.

Despite the advantages that contemporary audio device—and especially hearing aid—systems provide, some users may still experience hearing situations that are difficult. A critical element when seeking to alleviate such difficulties is the audio device systems ability to suppress noise.

It is therefore a feature of the present invention to provide a method of operating a hearing aid system that provides improved hearing loss compensation.

It is another feature of the present invention to provide a hearing aid system adapted to provide such a method of operating a hearing aid system.

It is yet another feature of the present invention to provide a non-transitory computer readable medium carrying instructions which, when executed by a computer, cause said method to be performed.

SUMMARY OF THE INVENTION

The invention is set out in the appended claims.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings:

FIG. 5 illustrates highly schematically a method according to an embodiment of the invention.

DETAILED DESCRIPTION

In the present context the term "audio signal" may be construed to mean an electrical (analog or digital) signal representing a sound. A beamformed signal (either monaural or binaural) is one example of such an electrical signal representing a sound. Another example is an electrical signal wirelessly streamed to the audio device system. However, the audio signal may also be internally generated by the audio device system.

Additionally the terms "predicted" and "forecasted" may be used interchangeably to represent signals or latent encodings that have been predicted by a forecaster and within this context it is additionally noted that the terms "forecaster", "forecasting model" and "forecasting stage" may also be used interchangeably.

Notation

In the present context a frame of audio signal samples may be denoted by a vector $x_t$ wherein the suffix represents a time stamp for the audio signal frame. However, in some cases the suffix may be omitted for improving readability so generally the symbols x and $x_t$ may be used interchangeably.

Likewise the term "audio signal frame" may sometimes be replaced simply with the term "audio signal" for improving readability and also to reflect that the term "audio signal frame" can be construed to have a length of one and therefore may represent a signal that is processed sample-by-sample.

Furthermore, it is noted that the audio signal may comprise several channels, e.g. several microphone signals, however in order to improve readability the audio signal terms and associated symbols will not necessarily change dependent on the number of channels.

In the present context the latent encoding is also given as a vector $z_t$ wherein the suffix represents a time stamp that indicates the time stamp of the audio signal frame that the latent encoding is calculated based on.

However, like for the audio signal samples, the suffix may be omitted for improving readability so generally the symbols z and $z_t$ may be used interchangeably.

Furthermore, it is noted, that despite the fact that the latent encoding generally results in a plurality of time-series, then the latent encoding terms and associated symbols will not necessarily change dependent on the number of latent encoding time-series in order to improve readability.

In the present context a predicted of a future latent encoding may be illustrated by a latent encoding vector with a tilde, i.e. $\tilde{z}_t$ or by $z_{t+k}$ where the added k in the suffix illustrates the number of time steps into the future that is predicted. Thus in the following these symbols and symbols comprising both the tilde and the added suffix may be used interchangeably.

Furthermore, it is noted that an output signal s may likewise use the tilde and the added suffix if the considered output signal is predicted into the future.

Figure 1:
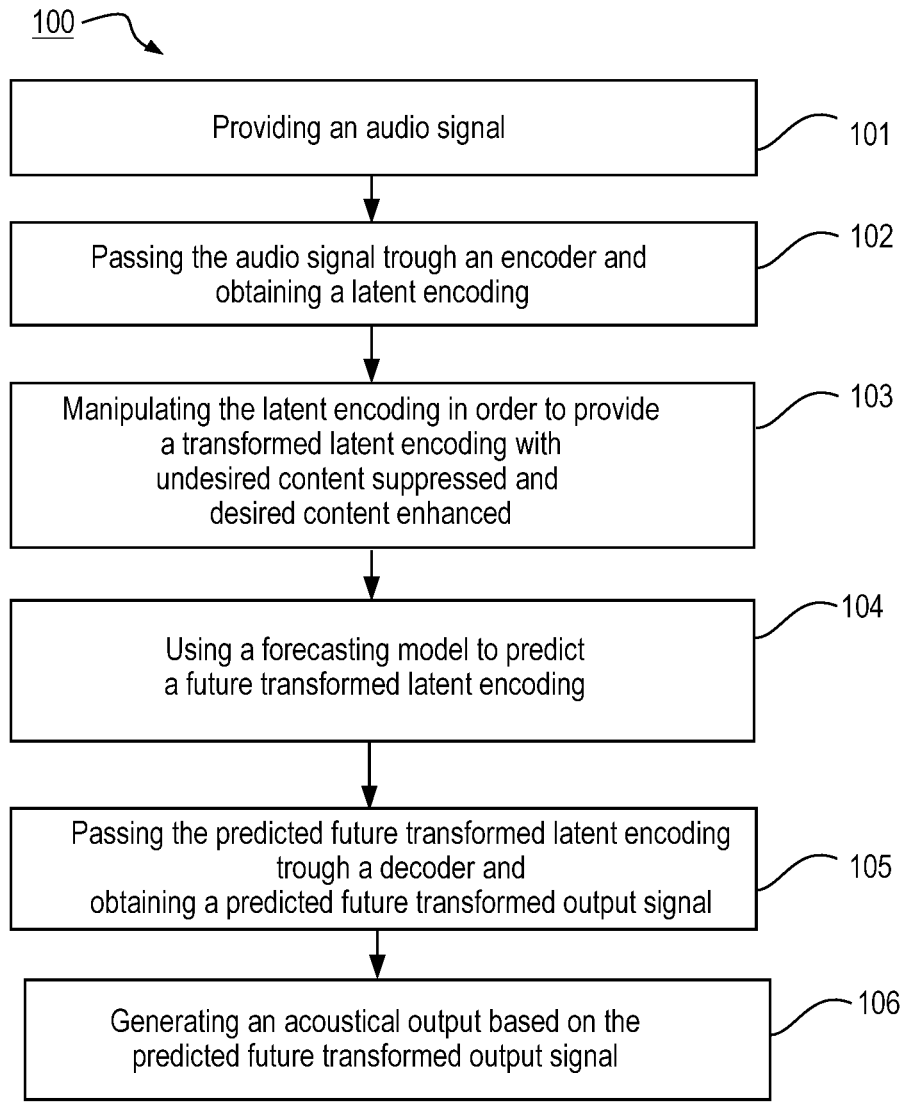
FIG. 1 illustrates highly schematically a method according to an embodiment of the invention.

FIG. 1: Method Embodiment

Reference is now given to FIG. 1, which illustrates highly schematically a flow diagram of a method 100 of operating an audio device system according to an embodiment of the invention.

1st Step: Providing Input Signal

In a first step 101 of the method an audio signal is provided.

According to different embodiments of the present invention the audio signal may be derived from at least one acoustical-electrical input transducer accommodated in the audio device system or may be wirelessly transmitted to a device of the audio device system or may be generated internally by a device of the audio device system.

According to more specific embodiments said at least one acoustical-electrical input transducer may be accommodated in an audio device (such as an earphone or a hearing aid) of the audio device system, but it may also be accommodated in an external device, which may also be denoted a computing device (such as a smart phone or a remote microphone system).

According to a specific embodiment the audio signal is derived from a single acoustical-electrical input transducer accommodated in an audio device (such as a hearing aid), but alternatively the audio signal is derived from at least two acoustical-electrical input transducers, i.e. the audio signal may by a monaurally or binaurally beamformed signal.

According to a specific embodiment the audio signal is wirelessly transmitted to a device of the audio device system from a tele coil system in operational connection with a computing device of the audio device system.

According to another specific embodiment the audio signal is generated internally in a computing device of the audio device system.

Such internally generated audio signals may be provided by e.g. an audio book application on a computing device such as a smart phone or a tablet, whereby the present invention can enable that the enunciation or other spectral or temporal speech characteristics (such as the pitch) for the speaker reading the book aloud can be selected based on the user's preferences or optimized based on a general criteria.

This can provide a superior alternative to the frequency transposing or frequency compression methods well known within the hearing aid field, where sound in a frequency range that a user can't hear no matter the amplification provided (which is the case for people having a so called steep hearing loss) is either:

moved up or down to a frequency that the user can hear and combined with the sound already there, which obviously is not the optimal solution, or where all the original sound is compressed to fit into the limited frequency range where the user can hear, which obviously neither is an optimal solution.

According to an even more specific feature, the audio device of the present invention may be configured to classify whether speech received by the audio device has some spectral or temporal speech characteristics (such as a pitch) that is not optimal for the user of the audio device system and consequently automatically or as an option change some of the spectral or temporal speech characteristics to something that will improve the speech understanding of the user e.g. by moving speech information away from a certain spectral range that the user can't hear, maybe because the user has a steeply sloping hearing loss. The inventors have realized that such a movement of speech information can be accomplished e.g. by changing the pitch of the received speech.

According to another embodiment, such internally generated audio signals may be provided from a live streaming (using e.g. an streaming application on a smart phone) of e.g. a sports event with commentators where it e.g. can be selected to consider spectator cheering or booing as noise and consequently suppress it (at least when the commentators are speaking). According to a similar embodiment various live interviews or debates or public speeches can likewise have the speech intelligibility improved using the present invention.

2nd Step: Encoding

In a second step 102 of the method an audio signal frame $x_t$ is passed through an encoder and hereby a latent encoding $z_t$ is obtained.

Audio Signal Specs (Sampling/Frame Length)

Thus, according to the present (i.e. the FIG. 1) embodiment the audio signal frame $x_t$ contains samples of the audio signal that have been sampled with a frequency of 16 KHz.

Preferably the sample frequency is at least above 8 kHz, or in the range between say 8 and 128 kHz.

According to the present embodiment the frame length is between 1 (sample-by-sample processing) and up say 200 samples which translates to delays up to around 10 milliseconds at a sampling frequency of 16 kHz.

Thus the variable t represents the time where the audio signal frame, which in the following will be denoted $x_t$ is provided. The function x may be expressed as a mixture function of s and n wherein s is the desired signal and n is some form of unwanted noise. Typically, the desired signal s will be speech and the unwanted noise n will be stochastic noise, but e.g. undesired sound sources (e.g. speakers or music that the user is not paying attention to) may also be considered unwanted noise in the present context.

According to the present embodiment the audio signal contains only a single channel (typically a microphone signal, a streamed signal or an internally generated signal), but in variations the audio signal may comprise any reasonable number of channels say between 2-4 or up to say 16 channels. However, basically, the number is only limited by the available processing resources and number of microphones.

According to the present embodiment the latent encoding $z_t$ has a lower sampling frequency of say 100 Hz or in the range between 50 Hz and 200 Hz, and more channels, say 64 channels or at least 32 channels, than said audio signal $x_t$. Thus the audio signal $x_t$ describes the low level physical audio (i.e. the sound pressure variations), whereas the latent encoding describes higher level information through a data-learnt representation (e.g. phonetic content of the signal).

3rd Step: Manipulation Stage

In a third method step 103 said latent encoding $z_t$ is manipulated in order to provide a transformed latent encoding $z_t'$ by carrying out at least one of:

removing or suppressing content of said latent encoding $z_t$ determined to be undesired, adding content, determined to be beneficial, to said latent encoding $z_t$, and
   enhancing content of said latent encoding $z_t$ determined to be beneficial.

According to one more specific embodiment sound source separation, i.e. the process of removing at least one undesired sound source in a sound environment comprising both a desired and at least one undesired sound source, can be obtained by identifying the parts of the latent encoding that represent the present sound sources and remove the undesired parts of the latent encoding.

According to a more specific embodiment sound source separation is carried out by estimating masks that can be applied to the latent encoding such that decoding masked encodings gives estimates of the component sources in isolation.

Masking or Transformation Model

According to a more specific embodiment said step of manipulating said latent encoding $z_t$ to provide a transformed latent encoding $z_t'$ comprises: using at least one of a masking model and a transformation model.

Thus at least one of the above mentioned steps of: removing or suppressing content of said latent encoding $z_t$ determined to be undesired and adding content, determined to be beneficial, to said latent encoding $z_t$ and enhancing content of said latent encoding $z_t$ determined to be beneficial may be obtained by at least one of the steps of using a masking model and a transformation model.

Suppress Noise/Change Pitch/Sound Separation

According to another more specific embodiment said step of manipulating said latent encoding $z_t$ to provide a transformed latent encoding $z_t'$ is adapted to provide at least one of:

noise suppression,
   change of at least one speech characteristic selected from a group comprising: spectral speech characteristics, temporal speech characteristics, enunciation, pronunciation, pitch and phoneme emphasis; and
   at least one of sound source separation, removal, suppression and enhancement.

4th Step: Forecasting Model

In a fourth method step 104 a forecasting model is used to provide a prediction of a future transformed latent encoding $z_{t+k}'$ based at least on said transformed latent encoding $z_t'$:

This forecasting step solves a major issue with implementing these principles namely the time it takes to encode the audio, to do the manipulation of the latent encoding and to decode the transformed latent encoding and hereby the resulting processing delays.

It is noted that especially for audio device systems the processing delay may be significant because it depends on the available computational power, which generally is limited in audio devices and considering e.g. computational power of a contemporary hearing aid the total processing delay may be minutes if not more which obviously is not acceptable and the power consumption will likewise be too high for contemporary hearing aids.

To mitigate this issue it may be a solution to distribute some of the processing from the audio device (e.g. a hearing aid) to a computing device such as a smartphone or even to a remote server (which in the following may also be denoted the cloud), but this introduces other delays as the audio device has to communicate (typically wirelessly) with the smartphone, or even further with the remote server (possibly using the smart phone as a gateway) and this type of communication also adds delays.

However, using a forecaster according to the present embodiment these delays may be at least partly compensated.

According to the present embodiment the forecaster (which in the following may also be denoted the forecasting stage) operates by receiving at least one transformed latent encoding $z_t'$ (and preferably a number of previous transformed latent encodings $z_{t-1}'$, $z_{t-2}'$, . . . ) and based hereon predict the transformed latent encoding for k future time steps, i.e.:

$$\{z_{t+1}', z_{t+2}', \ldots, z_{t+k}'\} = f(z_t', z_{t-1}', z_{t-2}', \ldots)$$

where f is a forecasting model that takes as input the transformed latent encoding at one time step and predicts k time steps into the future.

Claim 6 Probabilistic Forecasting Model

According to an embodiment the forecasting model is probabilistic, whereby the uncertainty of the forecasting can be quantified.

Thus, with a given transformed latent encoding $z_t'$ the forecasting model can give a probabilistic estimate of what the transformed latent encoding will be for the next time step(s). The further into the future the forecaster attempts to predict the larger the uncertainty becomes and consequently the risk of sound artifacts will increase accordingly.

Therefore, with a probabilistic forecasting model the uncertainty quantification can be used to limit how far into the future it is attempted to predict. This can be done by setting a threshold limit for the amount of uncertainty the forecaster can accept for a prediction. Thus a high threshold will allow prediction relatively long into the future, but will on the other hand introduce more errors and vice versa.

Consequently, how far into the future the forecasting will be made, is determined by the trade-off between the benefit of the signal processing according to the present invention and the amount of sound artifacts introduced due to the uncertainty of the forecasting model.

Thus according to a more specific variation of the FIG. 1 embodiment the method comprises the further steps of:

using a probabilistic forecasting model to provide an estimate of the uncertainty of the forecasting; and using only a prediction of a future transformed latent encoding $z_{t+k}'$ if the estimated uncertainty is below a given threshold.

Generally, the type of forecasting model can be selected from a group of forecasting model types comprising: linear regression, neural network, and Gaussian process.

According to a more specific embodiment the forecasting model may receive input from a language model and according to further specific embodiments the input to the language model may be at least one of the audio input signal, at least part of the latent encoding, and at least part of the transformed latent encoding.

According to another embodiment the language model can even replace the traditional forecasting model in case speech is detected.

According to an embodiment the language model is only active if speech has been detected in the audio input signal by a speech detector of the audio device system.

According to another embodiment the language model is only active if speech has been detected based on the latent encoding.

Thus according to the present embodiment it is possible to provide predicted future transformed latent encodings $z_{t+k}'$ some number (k) of time steps into the future. Consequently, the audio device will be able to generate a processed acoustical output with something close to no delay by using a predicted future electrical output signal $\tilde{s}_{t+k}$, as long as the time span of the predicted number of time steps is larger than the total processing and communication delays.

According to a more specific embodiment, the number (k) of predicted time steps into the future that is used to generate the processed acoustical output is dependent on an average of a subsequent number of estimated forecastings with an uncertainty that exceeds a given threshold.

5th Step: Decoding

In a fifth step 105 said predicted future transformed latent encoding $z_{t+k}'$ is passed through a decoder and hereby providing at least one predicted future transformed electrical output signal $\tilde{s}_{t+k}$.

One advantageous decoder type is the autoregressive decoder that uses e.g. temporal or causal links to inform the reconstruction of the decoder. This works very well for audio signals, such as speech where the beginning of a word heavily reduces the possible (reasonable) endings to that word. Thus, given an audio signal $x_t$ an autoregressive decoder uses not only the latent encoding $z_t$ to reconstruct $x_t$, but also $\hat{x}_{t-1}$ that is the reconstruction of $x_{t-1}$ and maybe even additional earlier reconstructed data, e.g. $\hat{x}_{t-2}$ and $\hat{x}_{t-3}$ and so on.

Thus the autoregressive decoder is especially advantageous because it generally improves the decoder performance and hereby also the reconstruction, but also because it has been shown to minimize processing sound artefacts.

AE and VAE

According to one more specific embodiment, said encoder and said decoder are both part of an autoencoder (AE) and according to another more specific embodiment, said encoder and said decoder are both part of a variational autoencoder (VAE).

Generally, AEs are a type of neural networks consisting of two blocks, an encoder and a decoder. The AE is trained to take some input and map (encode) it into a latent space and then attempt to reconstruct (decode) the original input from the latent encoding. The encoding is typically, but not necessarily, smaller (with respect to provided data over time) than the original input.

A Variational autoencoder (VAE) is similar to an AE, except in that encodings and reconstructions are distributions rather than deterministic as in an AE. The encoder function of an AE or a VAE is generally given as $q_\theta(z|x)$, which for an AE is a point mass density, where the values have no variance. As opposed hereto the density of a VAE may be given as $$q_\theta(z \mid x) = N\left(z; f_\theta^\mu(x), f_\theta^{\sigma^2}(x)\right)$$

wherein N is a normal distribution and wherein $$f_\theta^\mu(x) f_\theta^{\sigma^2}(x)$$

are neural networks. Thus, where the AE encodings are static the VAE encodings have some uncertainty associated with them.

Considering AE's such as e.g. VAE's the encoder and decoder are trained together to minimize the "reconstruction error", i.e. how far the reconstruction x is from the original audio signal x, while ensuring that the latent encoding z is a compressed, "well-behaved" representation. That is, the encoder is trained to represent the input more compactly while the decoder is trained to use the encoded information to recover the original input. Thus, once the network has been trained, the latent encoding z is a data-driven, learnt representation (or "feature-extraction"). Hereby the latent encoding z enables audio to be represented in a very compact way and hereby allows operations to be performed on a much smaller input than the entire waveform.

The VAE is particularly advantageous in the present context because it provides a latent encoding that is better suited (compared e.g. to AEs that are not Variational) as basis for the forecasting according to the present invention. This is so because the VAE is generally better suited at utilizing prior knowledge to impose e.g. slow variations.

Thus the VAE model can learn an explicit representation of the input (an encoding or latent representation) through a stochastic mapping (an inference network) from an input to a latent space. Learning this encoding is coupled with learning a similar mapping (a generative network) from the latent and back to original data. The mappings both produce distributions over either the latent space or the original data space.

Additionally, in learning these mappings, samples from these distributions are taken, and the parameterization of the distributions are updated to improve the model. The stochastic nature of the sampling can be likened to injecting noise in the learning procedure, and it enables models to learn both to characterize the variation for a particular input and to be robust to such variations.

6th Step: Acoustical Output

In a sixth step 106 an electrical-acoustical output transducer of the audio device is used to generate an acoustical output based on the predicted future electrical output signal $\tilde{s}_{t+k}$:

According to the present embodiment the audio device system will for each frame of the audio signal $x_t$ provide a transformed latent encoding $z_t'$ that is sent through the forecaster, which provides predictions $z_{t+k}'$ for some number of time steps and based hereon ultimately predicted future transformed electrical output signals $\tilde{s}_{t+k}$. Due to the processing and wireless communication delays, some of the output signal predictions $\tilde{s}_{t+k}$ may still be delayed relative to the current audio signal frame and will therefore be disregarded, while the prediction corresponding to the current time step will be played immediately by the electrical-acoustical output transducer. The predictions that are ahead of time will either wait and be played at the corresponding time step or be replaced if the signal processing of a subsequent time step is finished in time to provide a more accurate prediction based on the more recent information.

Time Stamp

Thus, according to a more specific embodiment the step of selecting a predicted future electrical output signal $\tilde{s}_{t+k}$ to be forwarded to the electrical-acoustical output transducer is based on selecting the predicted future electrical output signal $\tilde{s}_{t+k}$ having a time stamp that matches the time stamp of the most recent frame of the audio signal $x_t$.

Delays

Thus according to the present embodiment at least one of the method steps 102, 103, 104 and 105 are carried out in at least one computing device of the audio device system; and the processing delay resulting from at least one of:

data transmission between the devices of the audio device system and the processing carried out in step 102, 103 and 105 have been at least partly compensated by generating an acoustical output signal based on the predicted future electrical output signal $\tilde{s}_{t+k}$.

Figure 2:
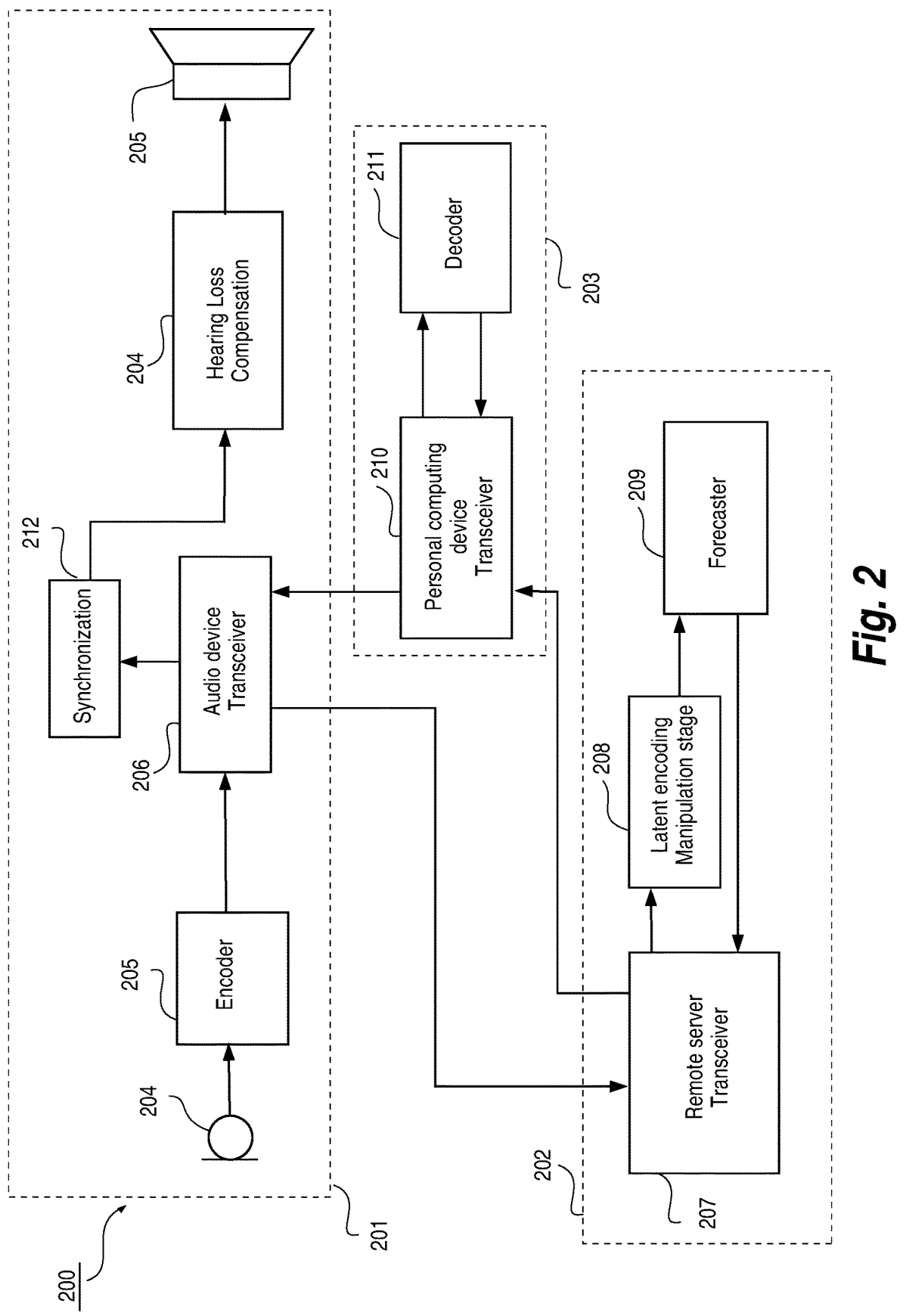
FIG. 2 illustrates highly schematically an audio device system according to an embodiment of the invention.

FIG. 2: Audio Device System Embodiment

Reference is now given to FIG. 2 which illustrates highly schematically an audio device system 200 (in the form of a hearing aid system) according to an embodiment of the invention. The audio device system 200 comprises a hearing aid 201, a remote server 202 and a personal computing device 203. All of which are operationally connected using wireless transceivers, 206, 207 and 210 accommodated in the hearing aid 201, the remote server 202 and the personal computing device 203 respectively.

The hearing aid 201 further comprises a microphone 204, an encoder 205, a hearing loss compensation block 204, a synchronization block 212 and an electrical-acoustical output transducer 205.

The remote server 202, further comprises a latent encoding manipulation stage 208 adapted to provide a transformed latent encoding $z_t'$ and forward it to a forecasting model 209 adapted to provide a prediction of a future transformed latent encoding $z_{t+k}'$ based on the transformed latent encoding $z_t'$.

Thus the hearing aid 201 and the remote server 202 are operationally connected to enable transmission of the latent encoding $z_t$ provided by the encoder 205 in the hearing aid 201 to the remote server 202.

In a similar manner the remote server 202 is also operationally connected with the personal computing device 203 in order to enable transmission of at least one prediction of a future transformed latent encoding $z_{t+k}$ from the remote server 202 and to the personal computing device 203, wherein said at least one prediction of a future transformed latent encoding $z_{t+k}$ is passed through a decoder 211 and the resulting predicted future transformed electrical output signal $\tilde{s}_{t+k}$ subsequently wirelessly transmitted back to hearing aid 201, using the transceivers 210 and 206 and through to the synchronization block 212 wherein the time stamp of the most recent (i.e. not yet played) audio signal frame is compared with the time stamps of the received predicted future transformed output signals $\tilde{s}_{t+k}$ and the most recently received predicted future transformed output signal $\tilde{s}_{t+k}$ with a time stamp matching that of the audio signal frame is selected and provided to the electrical hearing loss compensation block 204 and therefrom to the electrical-acoustical output transducer 205 in order to generate the desired acoustical output signal.

It is noted that the FIG. 2 embodiment is especially advantageous in that the processing steps are distributed such that the audio signal is encoded in the hearing aid 201, the latent encoding is transformed and forecasted in the remoter server 202 (i.e. in the cloud) and finally decoded on the personal computing device 203. Hereby advantage is taken of the fact that the latent encoding comprises less data than the audio signal and consequently that the transmission delay from hearing aid to remote server is relatively low and furthermore basically abundant processing resources are available in the cloud. Finally, the decoding is carried out in the personal computing device 203 instead of in the hearing aid 201 in order to reduce the hearing aid power consumption and to avoid spending too much of the limited hearing aid processing resources.

According to another more specific embodiment the personal computing device 203, e.g. in the form of a smart phone is used as gateway for transmitting the data from the hearing aid 201 and to the remote server 202.

According to a variation of the FIG. 2 embodiment the hearing loss compensation block 204 is omitted, because the invention is not necessarily limited to audio device systems comprising hearing aids, because e.g. the improved noise suppression and the low processing delay offered by the invention is beneficial also for normal hearing persons.

Figure 3:
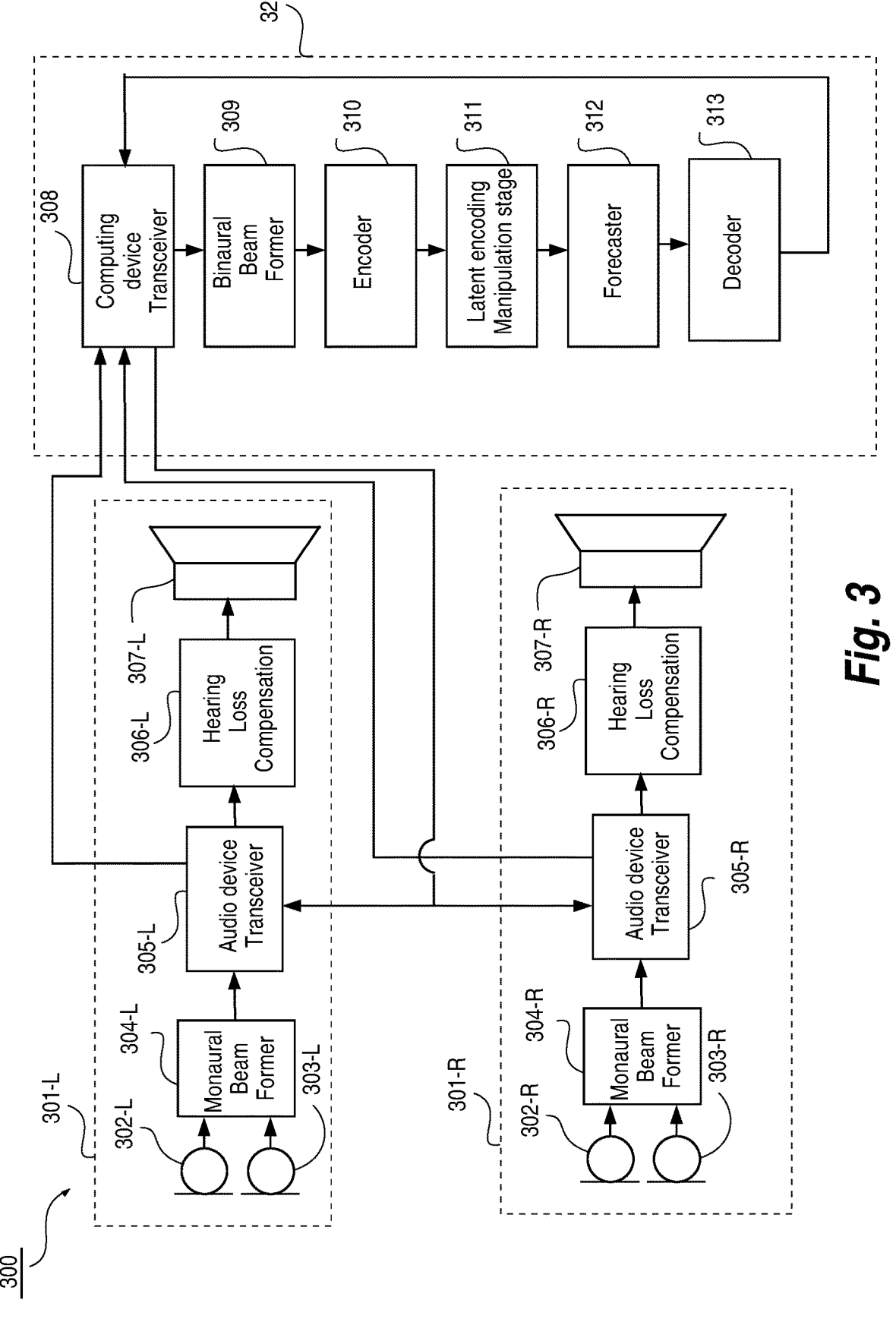
FIG. 3 illustrates highly schematically an audio device system according to another embodiment of the invention.

FIG. 3 Binaural HA system w Binaural BF (BBF)

Reference is now given to FIG. 3 which illustrates highly schematically an audio device system 300 according to another embodiment of the invention.

The audio device system 300 comprises a personal computing device 320 and a binaural hearing aid system having two hearing aids 301-R and 301-L. Each of the hearing aids 301-R and 301-L comprises a pair of microphones 302-R, 303-R and 302-L, 303-L respectively, a monaural beamformer 304-R and 304-L, an audio device transceiver 305-R, 305-L, a hearing loss compensation block 306-R, 306-L and an electrical-acoustical output transducer 307-R, 307-L respectively.

Each of the hearing aids 301-R and 301-L are operationally connected to the personal computing device 320 via the computing device transceiver 308, which forwards the two monaurally beamformed signals received from the two hearing aids to a binaural beam forming block 309 accommodated in the personal computing device. Subsequently the binaurally beamformed signal is provided to the processing blocks: encoder 310, latent encoding manipulation stage 311, forecaster 312 and decoder 313, all of which have already been discussed above.

According to more specific embodiments the latent encoding manipulation stage is adapted to provide at least one of noise suppression, change of a speech characteristic and source separation.

Finally, a predicted future electrical output signal $\tilde{s}_{t+k}$ is transmitted from the personal computing device and back to each of the hearing aids 301-R and 301-L where a frequency dependent gain is applied to the electrical output signal $\tilde{s}_{t+k}$ (by the hearing loss compensation block 306-R and 306-L respectively) in order to alleviate a hearing loss of an audio device system user and finally the resulting hearing loss compensated electrical output signal is provided to the electrical-acoustical output transducer 307-R, 307-L in order to generate the desired acoustical output signal.

The synchronization of the predicted future electrical output signal $\tilde{s}_{t+k}$ has already been discussed with reference to the FIG. 2 embodiment and is therefore not further considered here and for reasons of clarity neither shown in FIG. 3.

However, it is noted that the audio device system 300 may very well be set up to work with a fixed prediction into the future and as such a synchronization is not necessarily required. In fact this is a general observation that is likewise true for the other audio device system embodiments (e.g. the FIG. 2 embodiment).

The embodiment of FIG. 3 is particularly advantageous in that binaural hearing aid systems (or binaural audio device systems that does not include hearing aids) configured to provide a binaurally beamformed signal need to wirelessly transmit an audio signal out from each of the hearing aids and to the other hearing aid and consequently suffer the added transmission delay.

Thus, by incorporating the processing according to the present invention in a personal computing device, this added delay can be compensated, while at the same time providing improved sound quality e.g. by applying noise suppression in the form of at least one of e.g. stochastic noise suppression and sound source separation according to the present invention.

According to obvious variations of the FIG. 3 embodiment, the monaural beam former may be dispensed with, and likewise one of the microphones from the microphone pair in each hearing aid.

Figure 4:
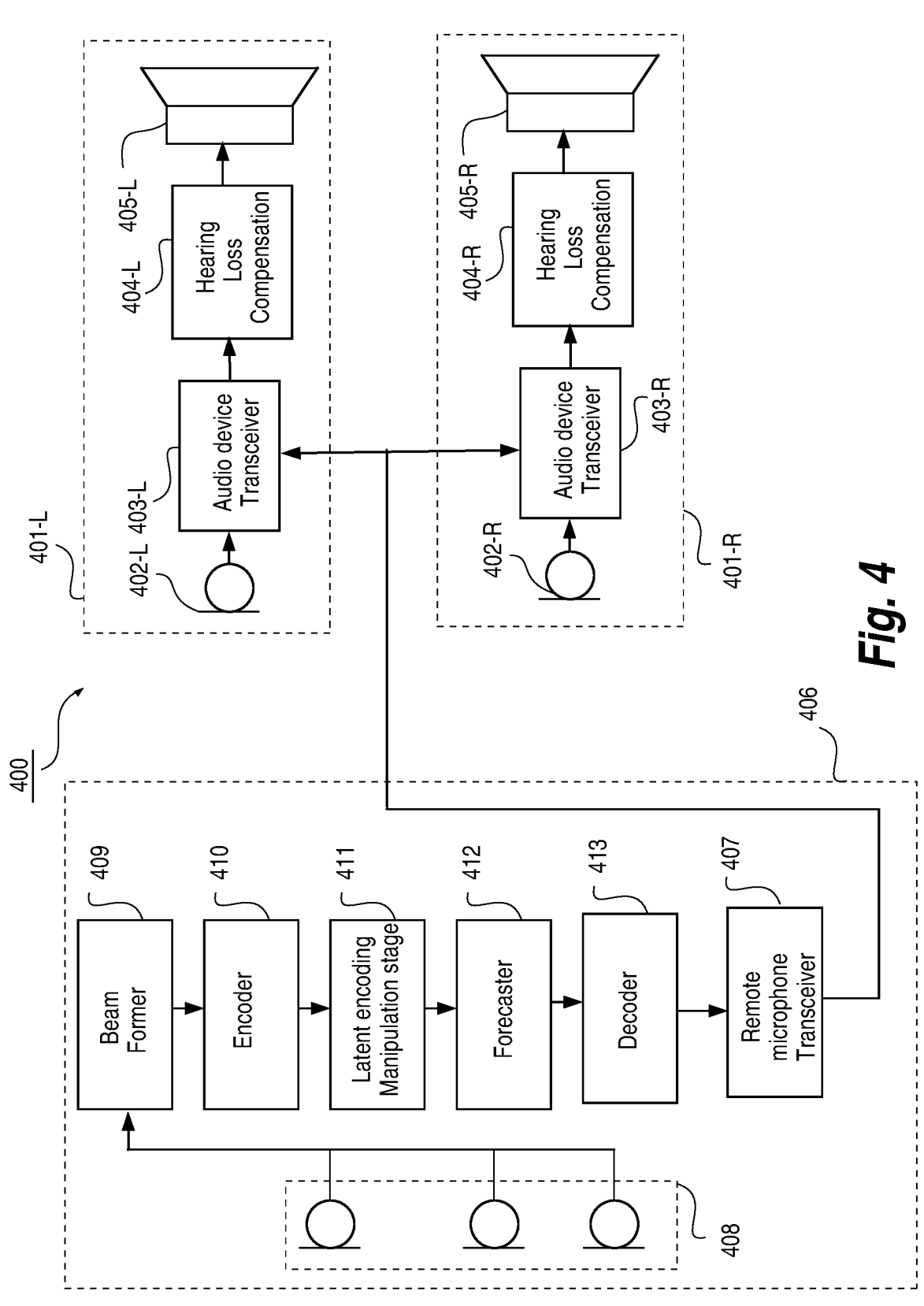
FIG. 4 illustrates highly schematically an audio device system according to yet another embodiment of the invention.

FIG. 4: Remote Microphone System

Reference is now made to FIG. 4, which illustrates highly schematically an audio device system (in the form of a hearing aid system) 400 according to another embodiment of the invention.

The audio device system 400 comprises a remote microphone system 406 and a binaural hearing aid system having two hearing aids 401-R and 401-L. Each of the hearing aids 401-R and 401-L comprises a microphone 402-R and 402-L, a hearing aid transceiver 403-R, 403-L, a hearing loss compensation block 404-R, 404-L and an electrical-acoustical output transducer 405-R, 405-L respectively.

Each of the hearing aids 401-R and 401-L are operationally connected to the remote microphone system 406 via the remote microphone transceiver 407 and the hearing aid transceivers 403-R and 403-L.

The remote microphone system 406 comprises a microphone array 408 which consists of three microphones that each provides a microphone signal to a beam former 409. Subsequently the beamformed signal is provided to the processing blocks: encoder 410, latent encoding manipulation stage 411, forecaster 412 and decoder 413, all of which have already been discussed above.

According to more specific embodiments the latent encoding manipulation stage is adapted to provide at least one of noise suppression, change of a speech characteristic and source separation.

Finally, a predicted future transformed electrical output signal $\tilde{s}_{t+k}$ is output from the decoder 413 and transmitted to the hearing aids 401-R and 401-L (using the remote microphone transceiver 407 and the hearing aid transceivers 403-R and 403-L) where a frequency dependent gain is applied to the electrical output signal $\tilde{s}_{t+k}$ (by the hearing loss compensation block 404-R and 404-L respectively) in order to alleviate a hearing loss of the binaural hearing aid system user and finally the resulting hearing loss compensated electrical output signal is provided to the electrical-acoustical output transducer 405-R, 405-L in order to generate the desired acoustical output signal.

It is noted that also the remote microphone system 400 may very well be set up to work with a fixed prediction into the future and as such a synchronization is not necessarily required.

The embodiment of FIG. 4 is particularly advantageous in that the remote microphone system 400 needs to wirelessly transmit an audio signal derived from the microphone signals received by the microphone array 408 and to the hearing aids 401-R and 402-L and consequently suffer the transmission delay.

Thus, by incorporating the processing according to the present invention in a personal computing device, this added delay can be compensated, while at the same time providing improved sound quality e.g. by applying noise suppression in the form of at least one of e.g. stochastic noise suppression and sound source separation or by changing a spectral characteristics of speech according to the present invention in order to improve speech intelligibility.

Furthermore it is noted that listening to predicted sound instead of the real-time sound may be beneficial in itself with respect to improving speech intelligibility because the predictability of speech is quite high and therefore it may be that by listening to predicted sound it will be possible to hear e.g. the last part of a word or sentence even in the case that this sound in real-time is totally masked by someone coughing or clapping or a door is slammed or something similar.

According to obvious variations of the FIG. 4 embodiment, one or more monaural or binaural hearing aids or other audio devices may be operationally connected with the remote microphone system.

Teleconferencing System

According to an especially advantageous embodiment the audio device system comprises teleconferencing equipment instead of e.g. a remote microphone system. The inventors have found that this embodiment may be especially relevant for the present invention because it is less sensitive to delay and consequently can enable embodiments of the present invention that include particularly time consuming processing, such as e.g. improving low quality enunciation due to at least one of the speaker and a bad internet connection.

Other Embodiments

DDAE: None-Latent Encoding Manipulation Stage

According to an alternative embodiment, the encoder-decoder structure reflected by claim 1 may be replaced by a Deep Denoising AE (DDAE), which has the consequence that the latent encoding manipulation stage can be skipped entirely. Instead the DDAE is trained to encode the information of a noisy signal x(t) comprising a clean signal s(t), into a latent representation z(t) and then decode z(t) to obtain the clean signal s(t). While it will be possible to forecast future clean signal samples s(t+k) from a DDAE, the inventors have found that the quality of forecasting is generally improved when carried out on latent encodings because these high level signals exhibit slower variations than the low level signals of e.g. the noisy input signal x(t) and the clean output signal s(t) and consequently are better suited for forecasting.

Thus while less preferred this alternative method embodiment according to the invention could be formulated as:

A method of operating an audio device system comprising the steps of:

providing an audio signal;

passing a frame of the audio signal through a deep denoising autoencoder and hereby obtaining a transformed electrical output signal using a forecasting model to provide a prediction of a future transformed electrical output signal based on at least one of said audio signal and said transformed electrical output signal;

using an electrical-acoustical output transducer of the audio device to generate a desired acoustical output based on the predicted future transformed electrical output signal.

Pitch Change—Use Case

According to a more specific embodiment:

the method step of manipulating said latent encoding $z_t$ to provide a transformed latent encoding $z_t'$ comprises the further step of adding content, representing a desired pitch of provided speech, to said latent encoding $z_t$ in order to change the pitch of the provided speech comprised in the audio signal.

Such a feature may be obtained by an encoder-decoder structure (such as, but not necessarily, an AE or a VAE) trained to reconstruct a given audio signal (which in the following may also be denoted audio input) containing speech. The audio input is fed into an encoder producing a latent representation, the decoder on the other hand is fed with the latent representation of the audio input and a number (which in the following may be denoted the pitch ID) identifying the pitch of the provided speech in the audio input. By optimizing the encoder-decoder structure to reconstruct the audio input, the encoder learns to represent the audio input optimally in the latent encoding, while the decoder learns to use the representation along with a provided pitch ID to reconstruct the audio. In this way the optimized encoder-decoder structure can change the spectral characteristics of speech (such as the pitch) from a given audio input to speech with a different (and desired) spectral characteristics by feeding the latent representation of the audio input together with a desired pitch ID to the decoder.

According to a more specific embodiment the pitch ID is given as a so called "one-hot encoding" wherein the binary number representing the pitch ID is as long as the number of different speakers used for the optimization, and wherein the number only contains zero's except for a single "one" such that the difference between the numbers only is the position of the single "one". This implementation of the pitch ID has been shown to improve the encoder-decoder structures ability to handle the pitch ID.

According to an alternative embodiment the so called "one-cold encoding" (comprising only a single "zero" as opposed to only a single "one") can obviously be applied.

This type of encoder-decoder structure is especially advantageous for audio device systems comprising a hearing aid, because it enables a hearing aid user to select speech spectral characteristics (such as a pitch) that are optimized with respect to the hearing aid users hearing loss. This can be achieved by moving spectral content of the audio input speech from a frequency range where the hearing aid user has little or no hearing ability to frequency ranges where the hearing loss is more limited. In contemporary hearing aid systems this same effect is achieved by compressing the total frequency range of the original speech signal to a more limited frequency range where the hearing aid user has more residual hearing, whereby the advantage of gaining access to (a distorted version of) the original signal should be weighed against the obvious detrimental consequences the compression will have for the sound quality and the speech intelligibility. The same is true for the likewise contemporary method of frequency transposing parts of the original speech signal and adding it to the limited frequency range where the hearing aid user has more residual hearing.

According to another more specific embodiment

"the method step of manipulating said latent encoding $z_t$ to provide a transformed latent encoding $z_t'$ comprises the further steps of:

adding content, representing a desired pitch of provided speech, to said latent encoding $z_t$ in order to change the pitch of the provided speech comprised in the audio signal, and removing latent encoding content representing noise."

Thus it is a specific advantage of this specific embodiment that change of speaker pitch and suppression of noise can be provided simultaneously and that this is true both for stochastic noise suppression and for sound source separation that can suppress noise by removing undesired sound sources.

According to a more specific embodiment the audio device system (typically in the form of a hearing aid system) comprises a speaker identifier. Speaker identification is well known within the field of audio devices and many different implementations exist. One implementation comprises generating a "voice print" of data derived from a given audio signal and comparing the generated voice print to previously obtained voice prints that each are associated to a specific speaker, whereby the speaker of said given audio signal may be identified as the person associated with said previously obtained voice print that best matches said generated voice print. Generally said voice prints may comprise any data that represents the voice including e.g. Mel Frequency Cepstral Coefficients (MFCC).

By having a speaker identifier running in parallel with the encoder-decoder structure it can be enabled that specific persons (important for the hearing aid user) that can become easier to understand if the spectral characteristics of their speech are changed will appear for the hearing aid user with a changed voice (i.e. changed spectral characteristics of their speech through a redistribution of the energy in the speech spectrum), but this changed voice (for that specific person) will for the hearing aid user remain constant. Thus the hearing aid user may select a plurality of specific persons and assign changed spectral characteristics to each of them, which will help the hearing aid user recognizing the specific person behind the changed voice.

According to a specific variation the hearing aid user selects the at least one specific person as part of the initial (and/or subsequent) hearing aid fitting session.

If said at least one person is not present at these sessions, said specific person can be invited to download a software application on a personal computing device and hereby be enabled to provide voice recordings for the speaker identifier comprised in the hearing aid user's hearing aid system. Alternatively, a personal computing device of the hearing aid system can be used to said voice recordings when the user and the specific person meet.

Additionally, said specific user may grant permission to store the voice recordings on a remote server, whereby other audio device system users may benefit from the availability of the recording when customizing the speaker identifier. As one example this may be beneficial for health care professionals that see and talk to a lot of hearing impaired people.

Thus a specific embodiment may comprise the further steps of:

"identifying a speaker as belonging to one out of a plurality of specific persons that have been assigned to have their pitch changed; and changing the pitch of said speaker in response to said identification."

Enunciation—Use Case

According to a Another More Specific Embodiment

"the method step of manipulating said latent encoding $z_t$ to provide a transformed latent encoding $z_t'$ comprises the further step of adding content, representing a desired rating of the enunciation of provided speech, to said latent encoding $z_t$ in order to improve the enunciation of the provided speech comprised in the audio signal."

According to another more specific variation the audio device system comprises an encoder-decoder structure trained to enable improvement of the enunciation of a speaker. As for the above mentioned feature of changing the pitch of a speaker voice this feature may especially be advantageous for hearing aid users. This feature is also similar to the pitch feature in that it will be beneficial to have a speaker identifier running in parallel, in order to have a personalized enunciation improvement applied to a group of specific persons.

However, according to another embodiment the audio device system comprises a classifier adapted to estimate the quality of the enunciation and if the estimated quality is below a certain level, it is automatically improved.

Training an encoder-decoder structure to improve the enunciation of a given person can be obtained in a manner similar to training an encoder-decoder structure to enable change of pitch (or some other spectral characteristic of speech). I.e. by feeding the audio input into the encoder of the encoder-decoder structure and hereby producing a latent representation and by letting the decoder receive the latent representation of the audio input together with an estimate of the quality of the enunciation of the audio input. By optimizing the encoder-decoder structure to reconstruct the audio input, the encoder learns to represent the audio input optimally in the latent encoding, and the decoder learns to use the latent representation along with the estimated enunciation quality to reconstruct the audio. The optimized encoder-decoder structure can therefore change enunciation of any given audio input by feeding the latent representation of the given audio input and a desired enunciation quality to the decoder.

Thus, the optimized encoder-decoder structure can reconstruct the audio input (in the form of speech) from a given speaker with improved enunciation and hereby improve speech intelligibility for the audio device system user.

According to a more specific embodiment the encoder-decoder structure could be trained on different human speakers saying the same sentences and based hereon having the speaker enunciation estimated by a plurality of audio device system users. Hereby the structure can learn to map between different enunciations, which is then used to only map to speaker enunciation measured to give the highest speech understanding Thus according to a specific variation of the method embodiment of the present invention comprises the further step of:

"identifying a speaker as belonging to one out of a plurality of specific persons that have been assigned to have their enunciation improved; and improving the enunciation of said speaker in response to said identification."

However, an even more important advantage of having the speaker identification is that it enables a method wherein some people as selected for or by a given audio device system user will have their pitch changed to better suit the user's hearing loss, while other people will have their enunciation improved instead.

Source Separation—Use Case

According to a another more specific embodiment

"the method step of manipulating said latent encoding $z_t$ to provide a transformed latent encoding $z_t'$ comprises the further steps of:

removing or suppressing content of said latent encoding $z_t$ representing an undesired sound source, wherein said sound source is considered to be undesired if at least one of:

said sound source is not positioned in the forward direction for the audio device system user;

said sound source has not been selected as the preferred sound source by the audio device system user through interaction with a personal computing device;

said sound source is not the focus of the audio device system users attention as determined using e.g. EEG sensors or eye tracking sensors, and the sound source does not comprise speech."

Thus having an encoder-decoder structure trained for source separation it is possible to extract the number and position of sound sources and subsequently suppress or remove the sound sources that are determined to be undesired.

According to an advantageous embodiment Electroencephalography (EEG) sensors are used to determine the sound source that is the focus of the users attention based e.g. on tracking similar waveforms in the EEG signal and the sound source signal or based on tracking eye movements using the EEG signal and compare them with the relative position of the sound sources. After having determined the sound source that is the focus of attention the rest of the sound sources are removed.

However, according to an alternative embodiment the audio device system comprises a personal computing device adapted to provide a GUI illustrating the present sound sources and enabling the user to select which one to focus on.

However, according to another advantageous embodiment the encoder-decoder structure is trained to suppress all sound sources except sound sources from the forward direction, whereby the user can control which sound source is selected by turning her head.

According to a more specific embodiment the encoder-decoder structure is trained both to suppress all sound sources except those positioned in the forward direction and furthermore enable at least one of change of pitch, improvement of enunciation and masking of sudden noises (i.e. avoiding the sudden noises as described below).

It is noted that encoder-decoder structures for source separation preferably receives audio input from at least 2 channels (i.e. microphones), although it is possible (but less preferred) to use only a single channel (microphone).

Masking Sudden Noises—Use Case

According to another more specific variation of the disclosed embodiments an encoder-decoder structure trained to avoid masking of speech from sudden noise is comprised in the audio device system.

Training an encoder-decoder structure to avoid such masking of speech can be obtained by using language models such as Bidirectional Encoder Representations from Transformers (BERT) and Generative Pre-trained Transformer 3 (GPT-3), which can understand semantics and are able to predict meaningful words and sentence continuations. Combining the semantic understanding of a language model with the present methods can improve the forecasting capabilities such that it will be possible to complete a word which would otherwise be masked by a sudden noise (e.g. a cough or a slammed door), by utilizing the semantic understanding from the language model to predict what was masked by the sudden noise and generate the audio without the sudden noise using the trained encoder-decoder structure.

Thus according to a more specific embodiment, a language model receives a predicted future transformed electrical output signal and provides based here on and based on the context of earlier predicted future transformed electrical output signals a language model output typically in the form of a vector that comprises data representing e.g. phonemes, words and an estimate of the probability that the prediction of the language model is correct.

The language model output is provided to the decoder along with the latent representation of the input audio.

The language model is typically trained using text input and consequently an Automatic Speech Recognizer (ASR) is required to transform the digital representation of the predicted future transformed electrical output signal into text. Most language models are trained using noisy text in the form of text with occasional errors, which also leads to output errors, whereby the language model can learn to replace the noisy text with clean (error free) text.

It will generally be advantageous to use the predicted future transformed output signal as input to the language model because the output signal generally will be a less noisy signal and consequently better suited for the forecasting provided by the language model.

However, according to a variation the audio input signal can be used as input to the language model, which especially is advantageous if the output signal from the language model is used to provide input to the forecasting model according to the present invention.

The semantic understanding of the language model will help inform the forecaster based on what is a natural continuation of what has previously been provided. Thus, sudden noises like coughing, clapping etc., can be identified as noise and the decoder of the encoder-decoder structure will be more likely to rely on the information from the language model to generate the natural continuation and hereby avoiding (i.e. masking out) the unwanted sudden noise.

According to yet another variation of the present invention the language model can be used to replace the forecasting model according to the present invention, but this will obviously only be advantageous when the audio input mainly consists of speech.

Thus, during training, the encoder-decoder structure is combined with a fixed, pretrained language model (i.e. the language model has already been optimized and is not changed further). The encoder-decoder structure receives an audio input, which can include unwanted sudden noises, and based also on the output from the language model to the decoder the encoder-decoder structure is optimized to reconstruct the audio input without masking by sudden noise.

According to yet another alternative embodiment the output from the language model is added as an additional dimension in the latent encoding.

Several Encoder-Decoder Structures

Another advantage of the present invention is that the at least partly distribution of the encoder-decoder processing to additional (external) devices such as personal computing devices and remote servers enables access to a plurality of encoder-decoder structures. With respect to the features of changing spectral speech characteristics (such as pitch) and improving enunciation, most people will not need to have both altered, instead the hearing aid user will select some people for having the spectral speech characteristics changed and select other people for having the enunciation improved and while it is definitely possible to at least partly re-use some parts of the encoder-decoder structure it may not generally be preferred because it may lead to a less than optimal encoding.

Thus according to a more specific embodiment of the present invention at least three different encoder-decoder structures may be selected and used as part of the main signal processing during normal operation of the audio device system dependent on the circumstances: in case a specific person is identified using a speaker identifier, an encoder-decoder structure trained to change a pitch of speech or an encoder-decoder structure trained to improve enunciation of speech is activated dependent on whether said specific person is associated with the pitch change or the enunciation improvement and in case such a specific person is not identified, then an encoder-decoder structure trained to avoid masking of speech due to sudden noises may be activated.

Here it is noted that the present invention is advantageous in being very well suited to work with a plurality of encoder-decoder structures because the distribution of the processing (which is made possible by the combination with output signal forecasting) to at least one additional device alleviates the restrictions on acceptable power, memory and processing requirements.

Thus according to an even more specific embodiment said three above mentioned encoder-decoder structures are operating in parallel (i.e. using the same input signal), whereby switching between the respective processed signals can be very fast.

According to an alternative embodiment only two different encoder-decoder structures may be selected and used as part of the main signal processing during normal operation of the audio device system. The two different encoder-decoder structures being trained to avoid masking of speech together with either of the pitch changing and enunciation improving encoder-decoder structures.

Various Audio Devices

As already illustrated the methods and systems of the present invention according to the disclosed embodiments may generally be implemented in both hearing aids and in audio devices that are not hearing aids (i.e. they do not comprise means for compensating a hearing loss), but nevertheless comprise both acoustical-electrical input transducers and electro-acoustical output transducers. Such systems and devices are at present often referred to as hearables. However, a headset or earphones are other examples.

It is noted that the present invention is particularly advantageous in connection with systems that include audio devices worn at, on or in an ear and that consequently the term audio device system according to an embodiment can be replaced with the term ear level audio device system.

Various Output Transducers

According to yet other variations, the hearing aids or audio devices need not comprise a traditional loudspeaker as output transducer. Examples of hearing aid systems that do not comprise a traditional loudspeaker are cochlear implants, implantable middle ear hearing devices (IMEHD), bone-anchored hearing aids (BAHA) and various other electro-mechanical transducer based solutions including e.g. systems based on using a laser diode for directly inducing vibration of the eardrum.

Independent Features

However, it is generally noted that even though many features of the present invention are disclosed in embodiments comprising other features then this does not imply that these features by necessity need to be combined.

As one example the inventive binaural HA system (the embodiment according to FIG. 3) and the remote microphone system (the embodiment according to FIG. 4) are both independent on the specific implementation of the encoder-decoder structure, e.g. whether or not the encoder-decoder structure is an AE, a VAE or a DDAE and/or whether or not the encoder-decoder structure is autoregressive.

As another example the inventive binaural HA system (the embodiment according to FIG. 3) and the remote microphone system (the embodiment according to FIG. 4) are both independent on the specific implementation of the forecasting model, i.e. whether it is based at least partly on at least one of a probabilistic model, linear regression, a neural network, or a Gaussian process.

As another example the details of the processing carried out by the processing blocks such as the manipulation of the latent encoding, and the forecasting model are generally independent on the specific system embodiments they are disclosed in, including whether the processing is carried out e.g. in a remote server or in a personal computing device such as smart phone, whether the processing is carried out as part of hearing aid system or as part of another audio device system and whether the processing is carried out in an AE or a VAE or some other encoder-decoder structure.

According to yet other variations of the disclosed embodiments a method of operating a hearing aid system (that does not necessarily comprise an encoder-decoder structure) based on at least one of forecasted (i.e. predicted) input signals, forecasted processed signals and forecasted output signals are given. It is noted that the various features and aspects of e.g. forecasting and language models that above are given in the context of audio device system comprising an encoder-decoder structure may also be combined with the embodiments directed at hearing aid systems unless inextricably linked.

Hearing aid systems with prediction (i.e. forecasting) are generally advantageous because they provide an artificial pseudo low-delay processing, which is advantageous for a plurality of well known reasons including an improved perceived sound quality for most people.

Furthermore it is noted that prediction is a particularly advantageous method when combined with hearing aid systems having a high frequency resolution filter bank, such as a frequency domain filter bank in the main signal path, because these types of filter banks provides a significant processing delay.

According to yet other variations of the disclosed embodiments a method of operating a hearing aid system having an encoder-decoder structure for improved signal processing but without necessarily requiring a forecasting model is given in the following. However, it is noted that the various features and aspects of encoder-decoder structures that above are given in the context of audio device system comprising a forecaster (i.e. forecasting model) may also be combined with the embodiments directed at hearing aid systems without a forecaster unless inextricably linked.

The various embodiments directed at latent processing in hearing aid systems, without necessarily comprising a forecasting model are in the following given as itemized embodiments:

Itemized embodiment 1a: A method of operating a hearing aid system comprising the steps of: a) providing an audio signal;

b) passing a frame of the audio signal $x_t$ through a neural network encoder and hereby obtaining a latent encoding $z_t$;

c) manipulating said latent encoding $z_t$ to provide a transformed latent encoding $z_t'$ by using at least one of a masking model and a transformation model;

d) passing said transformed latent encoding $z_t'$ through a neural network decoder and hereby providing a transformed electrical output signal $\tilde{s}_t$;

e) processing said transformed electrical output signal $\tilde{s}_t$ in order to alleviate a hearing deficit of an individual wearing the hearing aid system and hereby providing a hearing loss compensated electrical output signal $\tilde{s}_t'$;

f) using an electrical-acoustical output transducer of the audio device to generate an acoustical output based on the hearing loss compensated electrical output signal $\tilde{s}_t'$.

Itemized embodiment 2a: The method according to itemized embodiment 1a, wherein said audio signal is selected from a group comprising: an audio signal derived from at least one acoustical-electrical input transducer accommodated in the audio device system, an audio signal being wirelessly transmitted to a device of the audio device system, and an audio signal generated internally by a device of the audio device system.

Itemized embodiment 3a: The method according to itemized embodiment 1a, comprising the further steps of:

identifying a specific speaker in the sound environment, and using step c) to provide at least one of: change of spectral speech characteristics for said specific speaker and improvement of the speech enunciation for said specific speaker.

Itemized embodiment 4a: The method according to itemized embodiment 1a or 3a, comprising the further step of:

using step c) to provide at least one of source separation and noise suppression.

Itemized embodiment 5a: The method according to itemized embodiment 3a, wherein the provided type of change of spectral characteristics is determined based on the hearing loss of the hearing aid system user.

Itemized embodiment 6a: The method according to itemized embodiment 5a, wherein the provided type of change of spectral characteristics is adapted to shape the speech spectrum for said specific speaker such that speech energy is redistributed to at least one spectral range where the hearing loss of the hearing aid system user is not steep Itemized embodiment 7a: The method according to itemized embodiment 5a, wherein the provided type of change of spectral characteristics is change of the pitch.

Itemized embodiment 8a: The method according to itemized embodiment 1a comprising the further steps of:

identifying a primary speaker estimating the enunciation rating of the speech of said primary speaker using step c) to provide an improvement of the speech enunciation for said primary speaker if said enunciation rating is below a threshold.

Itemized embodiment 9a: The method according to itemized embodiment 1a, comprising the further steps of:

measuring at least one EEG sensor signal on said hearing aid system user;

determining the sound source that is the focus of the hearing aid system user's attention based on tracking similar waveforms in the EEG sensor signal and in the audio signal representing said sound source, and using step c) to removing or suppressing at least one sound source that is not the focus of the hearing aid system user's attention.

Itemized embodiment 10a: A hearing aid system comprising at least one acoustical-electrical input transducer;

an encoder-decoder structure;

a hearing loss compensation processor, and an electrical-acoustical output transducer, and wherein said encoder-decoder structure is adapted to carry out any one of the steps according to the itemized embodiments 1a and 3a-9a.

Itemized embodiment 11a: An internet server comprising a downloadable application that may be executed by a computing device, wherein the downloadable application is adapted to cause the steps of using encoder-decoder structure according to any one of itemized embodiments 1a and 3a-9a to be carried out.

Itemized embodiment 12a: A non-transitory computer readable medium carrying instructions which, when executed by a computing device carries out the method steps of itemized embodiments 1a-9a.

According to an alternative embodiment of the itemized embodiments the processing in order to alleviate a hearing deficit of an individual wearing the hearing aid system may be carried out before the encoder-decoder structure instead of after it as it is done in the itemized embodiments.

Reference is now given to FIG. 5 that illustrates highly schematically a method of operating a hearing aid system according to an embodiment of the invention.

FIG. 5 illustrates the method steps already given above with reference to itemized embodiment 1a.

The invention claimed is:

1. A method of operating a hearing aid system, the method comprising:

providing an audio signal;

passing a frame of the audio signal $x_t$ through a neural network encoder and hereby obtaining a latent encoding $z_t$;

manipulating said latent encoding $z_t$ to provide a transformed latent encoding $z_t'$ by using at least one of a masking model and a transformation model;

passing said transformed latent encoding $z_t'$ through a neural network decoder and hereby providing a transformed electrical output signal $\tilde{s}_t$;

processing said transformed electrical output signal St in order to alleviate a hearing deficit of an individual wearing the hearing aid system and hereby providing a hearing loss compensated electrical output signal $\tilde{s}_t'$; and using an electrical-acoustical output transducer of the audio device to generate an acoustical output based on the hearing loss compensated electrical output signal $\tilde{s}_t'$.

2. The method according to claim 1, wherein said audio signal is selected from a group comprising: an audio signal derived from at least one acoustical-electrical input transducer accommodated in the audio device system, an audio signal being wirelessly transmitted to a device of the audio device system, and an audio signal generated internally by a device of the audio device system.

3. The method according to claim 1, further comprising:

identifying a specific speaker in the sound environment, and wherein the manipulating said latent encoding $z_t$ provides at least one of: change of spectral speech characteristics for said specific speaker and improvement of the speech enunciation for said specific speaker.

4. The method according to claim 3, wherein the provided change of spectral characteristics is determined based on the hearing loss of the hearing aid system user.

5. The method according to claim 4, wherein the provided change of spectral characteristics is adapted to shape the speech spectrum for said specific speaker such that speech energy is redistributed to at least one spectral range where the hearing loss of the hearing aid system user is not steep.

6. The method according to claim 4, wherein the provided change of spectral characteristics is change of the pitch.

7. The method according to claim 1, further comprising:

wherein the manipulating said latent encoding $z_t$ provides at least one of source separation and noise suppression.

8. The method according to claim 1, further comprising:

identifying a primary speaker, and estimating the enunciation rating of the speech of said primary speaker;

wherein the manipulating said latent encoding $z_t$ provides an improvement of the speech enunciation for said primary speaker if said enunciation rating is below a threshold.

9. The method according to claim 1, further comprising:

measuring at least one EEG sensor signal of a hearing aid system user;

determining the sound source that is the focus of the hearing aid system user's attention based on tracking similar waveforms in the EEG sensor signal and in the audio signal representing said sound source, and wherein the manipulating said latent encoding $z_t$ removes or suppresses at least one sound source that is not the focus of the hearing aid system user's attention.

10. The method according to claim 1, wherein the alleviating the hearing deficit of the individual wearing the hearing aid system is performed prior to the passing of the frame of the audio signal $x_t$.

11. A hearing aid system comprising at least one acoustical-electrical input transducer; an encoder-decoder structure; a hearing loss compensation processor, and an electrical-acoustical output transducer, and adapted to carry out any one of the methods according to claim 1.

12. An internet server comprising a downloadable application that may be executed by a computing device, wherein the downloadable application is adapted to cause the encoder-decoder structure to carry out any of the method steps according to claim 1.

13. A non-transitory computer readable medium carrying instructions which, when executed by a computing device carries out the method steps of claim 1.

* * * * *